D. CRAIG.
SPRING TIRE.
APPLICATION FILED MAR. 8, 1907.
907,316.
Patented Dec. 22, 1908.
2 SHEETS—SHEET 1.
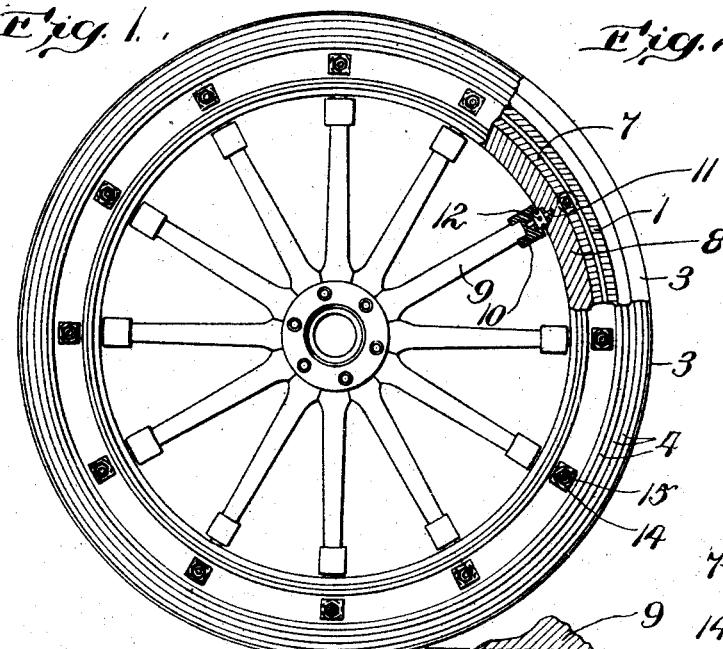
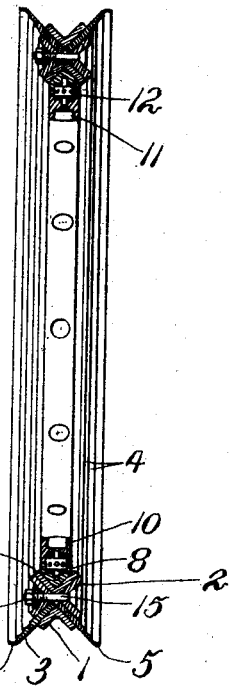
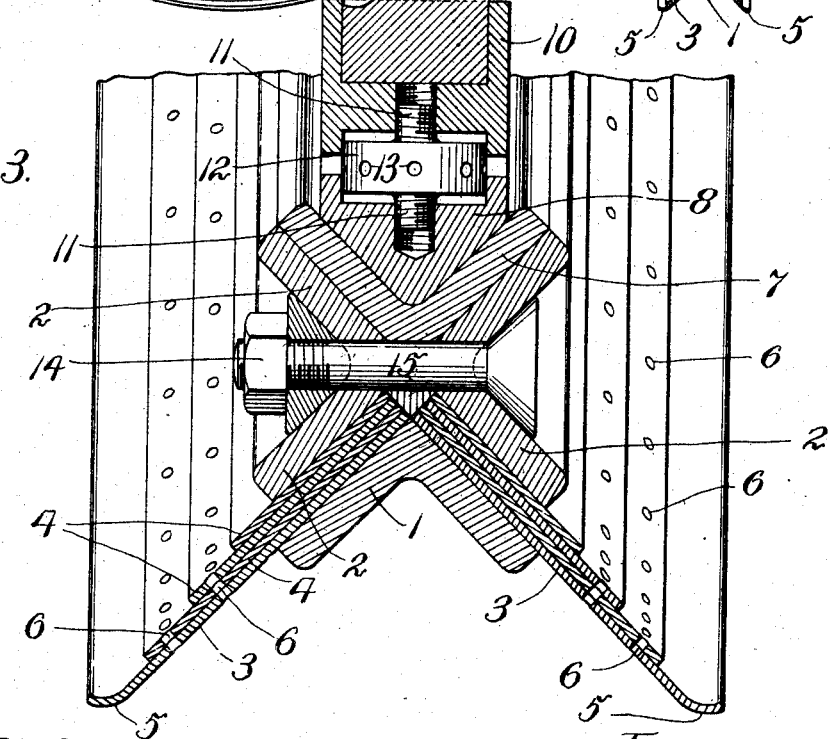
Witnesses:
Inventor:
David Craig,
by Roberts + Mitchell,
Attorneys.

D. CRAIG.
SPRING TIRE.
APPLICATION FILED MAR. 8, 1907.

907,316.

Patented Dec. 22, 1908.
2 SHEETS—SHEET 2.

Witnesses:

Inventor:
David Craig,
by Roberts & Mitchell,
Attorneys.

UNITED STATES PATENT OFFICE.

DAVID CRAIG, OF MELROSE, MASSACHUSETTS.

SPRING-TIRE.

No. 907,316.  Specification of Letters Patent.  Patented Dec. 22, 1908.

Application filed March 8, 1907. Serial No. 361,258.

*To all whom it may concern:*

Be it known that I, DAVID CRAIG, a citizen of the United States, and resident of Melrose, in the county of Middlesex and State of Massachusetts, have invented new and useful Improvements in Spring - Tires, of which the following is a specification.

My invention relates to spring tires for wheels and its object is to provide an improved and novel form of metal spring tire which shall be inexpensive in construction, efficient in operation, and which will overcome the many disadvantages to which pneumatic tires and other forms of tires are subject.

Figure 5:
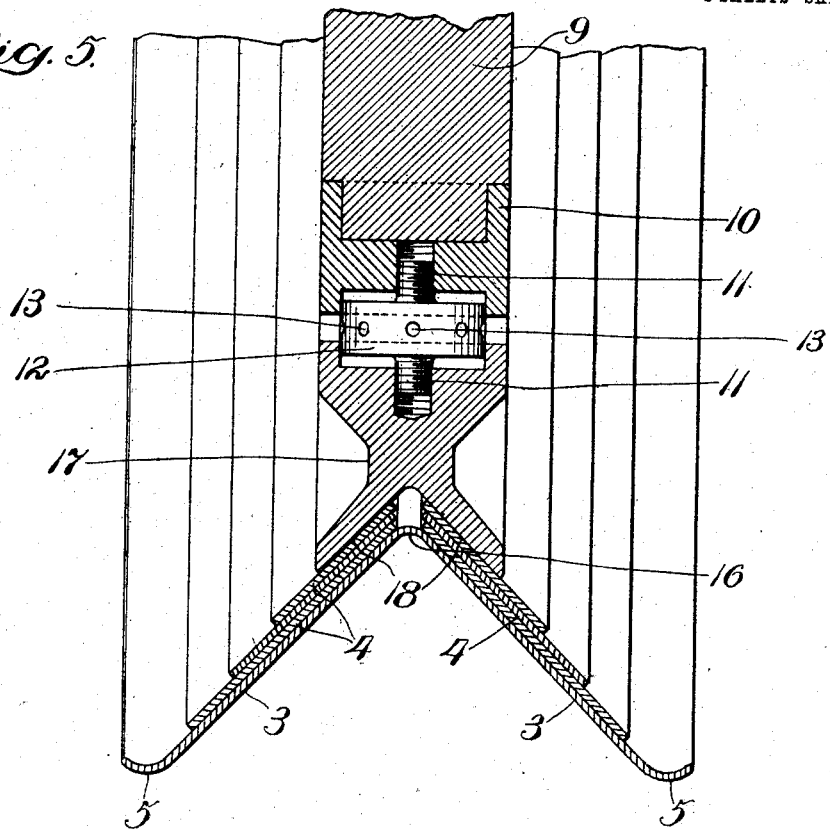
Figure 4:
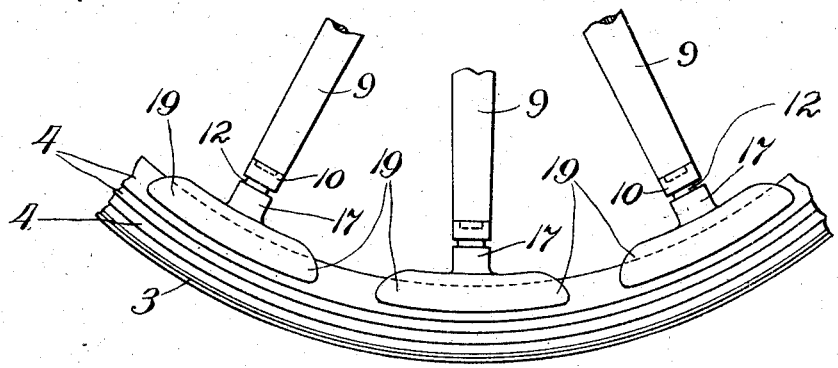

In the accompanying drawings illustrating certain embodiments of my invention,— Figure 1 represents a wheel in side elevation, partly in section embodying one form of my invention; Fig. 2 represents said wheel in vertical cross section; Fig. 3 is an enlarged detail of the tire shown in Figs. 1 and 2, in cross section illustrating one method of securing my spring tire to the rim of a wheel; Fig. 4 represents part of a wheel in side elevation embodying another form of my invention; Fig. 5 represents in cross section an enlarged detail of the tire and securing means shown in Fig. 4.

Referring to the drawings, (Figs. 1 to 3), 1 represents a V-shaped outer rim. 2, 2 represent clamping rims, herein shown as angle metal. The tread of the tires is composed of the peripheral leaf springs 3, 3 clamped between the V-shaped rim 1 and the clamping rims 2 and diverging from the center of the rim of the wheel at either side thereof as shown. Reinforcing leaf springs 4, 4 may be employed if it is desired to give the leaf spring tire greater stiffness than it would have by the use of the single leaf spring 3. Any desired number of stiffening springs 4, 4 to give the tire the proper stiffness may be used. The outer peripheral leaf spring 3 is turned outwardly at its outer edge, at either side of the tire, as shown at 5, 5 to give the tire an easier contact with the ground than it would have without such outwardly turned edges. Air vents 6, 6 are provided at frequent intervals along the peripheral springs to prevent undue suction between the tire and the road when the wheel is being operated.

To secure the tire to the wheel an inner V-shaped rim 7 is provided, against which an abutment 8 is placed at the end of each spoke 9. The end of the spoke 9 fits into a socket member 10, between which and the abutment 8 is a right and left handed screw 11 provided with a turning nut such as the capstan nut 12, having holes 13 for an operating lever. By turning the right and left handed screw 11 in the direction to thrust the abutment 8 outwardly, and by setting up the nut 14 on the screw or bolt 15 to draw the two clamping rims 2, 2 together, the leaf springs will be securely clamped between the V-shaped rim 1 and the clamping rims 2 and the tire will be rigidly bound to the wheel.

A modified form of tire and securing means is shown in Figs. 4 and 5. In this form of the invention the V-shaped rim 1 is dispensed with, and the outer peripheral and divergent springs 3, 3 instead of being two separate springs as shown in Figs. 1 to 3 are made in a single piece bent as shown at 16. The stiffening springs 4, 4 are shown the same as in the other form of the tire, but obviously could be made like the outer spring, each layer of a single piece bent over the point 16. The rims 2 and 7 may also be dispensed with and another form of holding means used, such as the grooved abutments 17 having the divergent faces 18, 18 forming between them a trough or groove. The inner ends of said abutments 17 and the device connecting them with the ends of the spokes may be the same as shown in the abutment 8. The outer grooved ends of the abutments 17 are extended or flaring as shown at 19 so as to give proper support to the spring tire between the spokes, as best appears in Fig. 4. When the capstans 12 are turned to thrust the abutments 17 outwardly the tire will be held in position; the tensile strength of the tire itself being employed instead of the V-shaped rim 1.

Other means of securing the tire to the wheel may be used, and I do not wish to limit the scope of my invention to the specific means shown. The peripheral leaf springs are preferably made of continuous pieces of spring steel. When the outer rim 1 is used it is possible to make them in sections, and if made in sections when clamped as above described they become substantially and practically continuous. When the outer rim 1 is not used and the outer peripheral spring is used to withstand the expanding force of the securing means, as in Figs. 4 and 5, the outer peripheral spring should be continuous, or if sectional the sections should be riveted together.

Instead of the two separate sets of leaf springs, one set projecting on one side of the rim and the other set on the other side of the rim as shown, it is obvious, as has already been described, that a single set of leaf springs could be employed, the leaves 3 and 4 respectively being made of a single piece of spring steel bending over the V-shaped rim 1 and extending outward on either side thereof to form the divergent spring tread as shown.

While my spring tire is shown as contained in a vehicle wheel and is peculiarly well adapted to such wheel as a substitute for pneumatic tires which easily puncture and quickly wear out, it is also adapted to use in other wheels in other situations where the periphery of the wheel is in frictional contact with a way, belt, friction wheel, or the like. The tire will tend to conform to the surface of whatever it has frictional contact with,—whether it be a road, belt or other surface.

I claim:

1. In a wheel, a tire comprising peripheral leaf springs diverging from the central plane of the wheel, and means for securing the leaf springs to the wheel, comprising a support against the inner side of the tire having its peripheral face composed of a pair of divergent surfaces, an outer rim V-shaped in cross-section, said support and rim holding the springs between them, and means to clamp said support, springs and outer rim together.

2. In a wheel, a tire comprising peripheral leaf springs divergent from the central plane of the wheel, and means for securing the leaf springs to the wheel, comprising abutments at the ends of the spokes, a V-shaped outer rim, a pair of angle clamping rims, said springs being held between the outer rim and the clamping rims, and means to clamp said rims and springs together.

3. In a wheel, an inner rim of angle metal having its apex pointed outward, an outer rim of angle metal having its apex pointed inward, a pair of clamping rims of angle metal, a tire comprising peripheral leaf springs held between said outer rim and said clamping rims, and means to clamp said rims and springs together, substantially as described.

4. In a wheel, an inner rim of angle metal, having its apex pointed outward, an outer rim of angle metal having its apex pointed inward, a pair of clamping rims of angle metal, a tire comprising peripheral leaf springs held between said outer rim and said clamping rims, and bolts adapted to draw said angle clamping rims toward one another, whereby all of said parts will be clamped together.

5. In a wheel, a tire comprising peripheral leaf springs diverging from the central plane of the wheel, and means for securing the tire to the wheel comprising a support against the inner side of the tire, an outer annular member coöperating with said support to hold such leaf springs, and means to clamp said outer member, springs and supports together.

6. In a wheel, spokes expansible and contractible in length, a tire comprising peripheral leaf springs diverging from the central plane of the wheel, and means for securing the leaf springs to the spokes comprising supports at the ends of the spokes against the inner side of the tire, an outer annular member coöperating with said supports to hold such leaf springs, and means to clamp said outer member, springs and supports together.

7. In a wheel, a tire having a tread comprising peripheral leaf springs secured to and diverging from the center of the rim of the wheel, said springs being provided with air vents.

Signed by me at Boston, Massachusetts, this sixth day of March 1907.

DAVID CRAIG.

Witnesses:
ROBERT CUSHMAN,
JOSEPHINE H. RYAN.